UNITED STATES PATENT OFFICE.

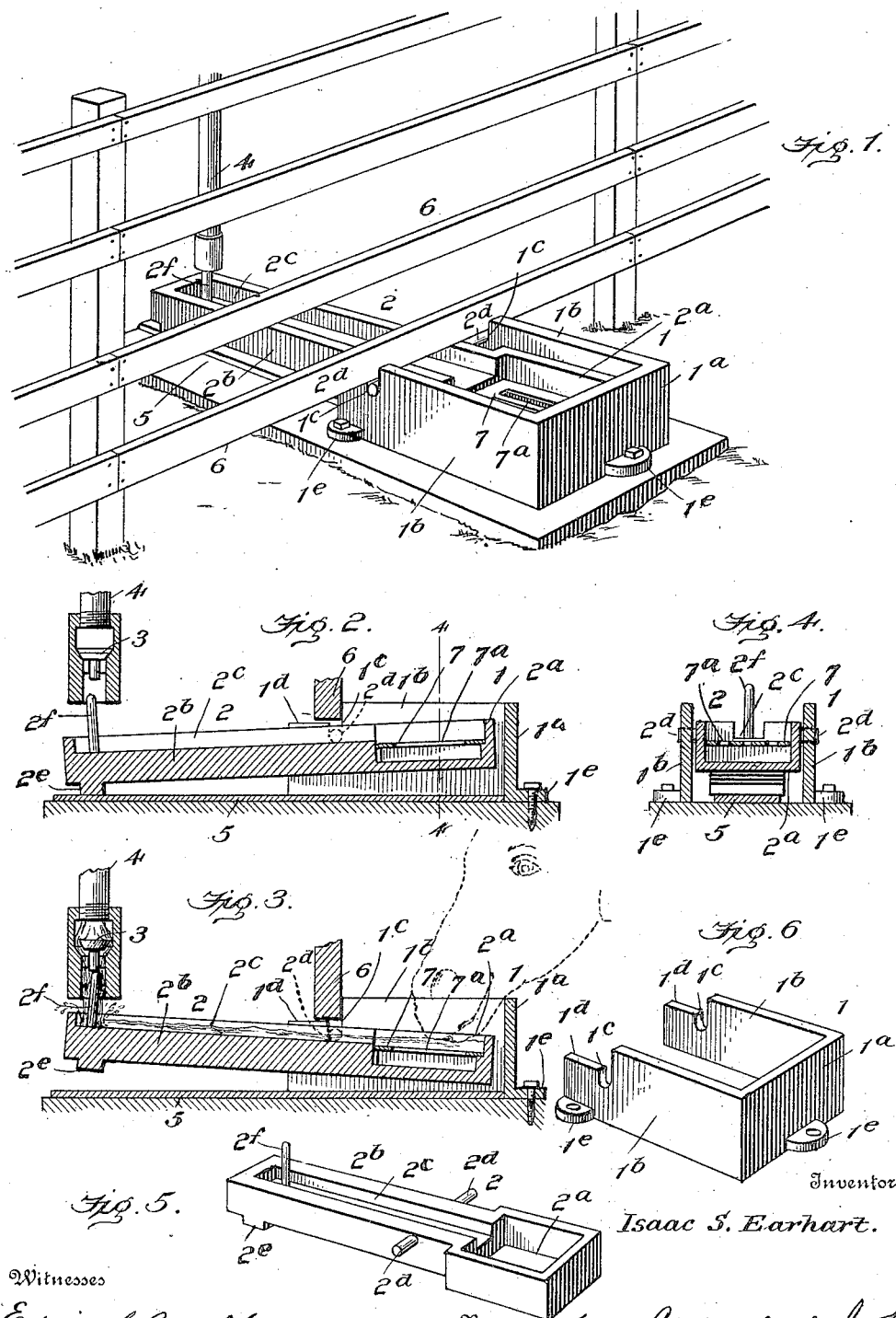

ISAAC S. EARHART, OF NEAR CALDWELL, KANSAS.

WATER-TROUGH.

No. 875,162.   Specification of Letters Patent.   Patented Dec. 31, 1907.

Application filed May 28, 1907. Serial No. 376,054.

*To all whom it may concern:*

Be it known that I, ISAAC S. EARHART, residing near Caldwell, in the county of Sumner and State of Kansas, have invented certain new and useful Improvements in Water-Troughs, of which the following is a specification.

My invention relates to certain new and useful improvements in watering troughs for cattle, horses and the like, and in its generic nature, the invention comprises a support on which a trough is fulcrumed. The trough comprises a water containing bowl and an elongated grooved arm which coöperates with a water supply valve to automatically supply the water to the bowl portion of the trough, and the invention also includes means for retaining the trough in its support, and also to provide a guard to prevent the cattle or stock tampering with the supply valve or using any portion of the trough other than the water containing bowl.

In its more subordinate nature, the invention embodies certain novel features of construction, combination and arrangement of parts, all of which will be first described in detail, and then be specifically pointed out in the appended claims, reference being had to the accompanying drawings, in which:—

Figure 1, is a perspective view of the invention. Fig. 2, is a central, vertical, longitudinal section of the invention, the trough being in its normal position. Fig. 3, is a similar view, showing the position of the parts when the trough is rocked to supply water to the bowl thereof. Fig. 4, is a cross section on the line 4—4 of Fig. 2. Fig. 5, is a perspective view of the trough. Fig. 6, is a similar view of its support.

Referring now to the accompanying drawings, in which like letters and numerals of reference, indicate like parts in all of the figures, 1 designates the support which is of substantially U-shape in horizontal section or plan view and comprises the front portion $1^a$ and side portions $1^b$ which are provided near their rear ends with trunnion bearings $1^c$ and the walls $1^b$ are also cut away as at $1^d$, at their rear end. $1^e$ designates securing lugs formed and projecting from the walls $1^a$—$1^b$ by means of which the support 1 may be secured to any suitable base, such as the ground or the floor of a stable, etc.

2 designates the trough which comprises the water containing bowl portion $2^a$ and the elongated arm $2^b$ having a water runway $2^c$, as shown, and provided with trunnions $2^d$ to coöperate with the trunnion bearings of the support 1. The arm $2^b$ carries a valve tripping member $2^f$ which is adapted to trip or open the valve 3 in the water supply pipe 4, as shown, for a purpose presently to be explained.

$2^e$ designates a stop portion beneath the arm $2^b$ to limit the movement of the trough member, on its fulcrum.

5 designates a plate secured beneath the trough member 2 in a fixed position to coöperate therewith and form a stop for the trough to bear against at the limit of its rocking movements.

In order to hold the trough 2 with its trunnions $2^c$ in their bearings, I provide a guard member 6, which passes over the trunnions $2^d$ and over the cut away portion of the support. The guard 6 also serves as a means for preventing the cattle or stock taking water from the trough except at the water bowl end thereof. This guard 6 is shown as a wall or fence in the drawings.

Within the water bowl $2^a$ is a skeleton plate 7 which is removably held in the bowl but spaced from the bottom thereof, the skeleton plate 7 having openings $7^a$ so as to expose the water which is within the bowl beneath the plate 7, thus the stock desiring water, will, in endeavoring to get the water from under the plate 7, rock the trough in its trunnions and force the valve tripping rod, upwardly to open the water valve in the supply pipe. This permits water to flow down in the groove or channel $2^c$ and from thence into the bowl portion of the trough to completely fill the same. As soon as the trough has been filled or as soon as the animal which is drinking at the trough ceases pushing down on the bowl portion thereof, the weight of the arm $2^b$ will be sufficient to again bring the trough to the position shown in Figs. 1 and 2 and bring the water supply valve to its closed position. Thus it will be seen that water is automatically fed to the bowl portion of the trough only in such quantity as is needed by the stock desiring water and as soon as the stock has obtained its desired amount of water and leaves the trough, the water supply will be cut off, and hence a waste of water will be prevented.

It will be also noticed that the trough support 1, where it surrounds the bowl portion of the trough, has its sides $1^a$—$1^b$ projecting above the upper surfaces of the bowl portion of the trough to form a guard therefor, and thus preventing the stock from lying down in the water bowl or in any other way interfering with the operation of the trough, and furthermore the plate beneath the trough serves to prevent rotting or decay of the floor should the apparatus be used in a stable having a wooden floor.

By constructing a trough as shown and described, it will be seen that the trough and support therefor can be easily formed by casting or in any approved manner.

From the foregoing description taken in connection with the accompanying drawings, it is thought the complete construction, operation and many advantages of my invention will be readily understood by those skilled in the art to which the invention appertains.

What I claim is:

1. A device of the class described, comprising a support, a trough consisting of a bowl portion and an arm portion, means for pivotally mounting said trough in said support, said arm portion having a groove merging with the water bowl portion, a valved source of water supply, means carried by the arm portion of the trough for tripping the water supply valve as the trough is rocked, means for normally holding the trough in a position with its valve tripping member out of engagement with the valve, and means for holding the trough in its support and forming a stock guard for the source of water supply substantially as shown and described.

2. A device of the class described, comprising a support, a trough consisting of a bowl portion and an arm portion, means for pivotally mounting said trough in said support, said arm portion having a groove merging with the water bowl portion, a valved source of water supply, means carried by the arm portion of the trough for tripping the water supply valve as the trough is rocked, means for normally holding the trough in a position with its valve tripping member out of engagement with the valve, and a relatively immovable skeleton guard plate removably held within the water bowl, substantially as shown and described.

3. A device of the class described, comprising a support, a trough consisting of a bowl portion and an arm portion, means for pivotally mounting said trough in said support, said arm portion having a groove merging with the water bowl portion, a valved source of water supply, means carried by the arm portion of the trough for tripping the water supply valve as the trough is rocked, means for normally holding the trough in a position with its valve tripping member out of engagement with the valve, means for holding the trough in its support and forming a stock guard for the source of water supply, and a relatively immovable skeleton guard plate removably held within the bowl portion, substantially as shown and described.

4. A device of the class described, comprising in combination with a support having sides and ends and bearing notches in such sides, said sides having cut-away portions at their rear ends, a trough member having a bowl portion and an elongated arm portion, trunnions projecting from said arm portion to coöperate with the bearing notches of the support, said arm portion having an elongated groove merging with the trough portion, a valved source of water supply, means carried by the arm portion for tripping the supply valve at times, a fence or guard held over the cut-away portion of the sides to retain the trunnions of the trough member in their bearings substantially as shown and described.

5. A device of the class described, comprising in combination with a support having sides and ends bearing notches in said sides, said sides having cut-away portions at their rear ends, a trough member having a bowl portion and an elongated arm portion, trunnions projecting from said arm portion to coöperate with the bearing notches of the support, said arm portion having an elongated groove merging with the trough portion, a valved source of water supply, means carried by the arm portion for tripping the supply valve at times, a fence or guard held over the cut-away portion of the sides of said support to retain the trunnions of the trough member in their bearings, and a removable skeleton plate held in said bowl portion and spaced from the bottom thereof, substantially as shown and described.

ISAAC S. EARHART.

Witnesses:
 CLYDE BAILEY,
 EDWARD LEE MITOK.